INVENTOR.
Carlotto Baumeister
BY

United States Patent Office 3,176,544
Patented Apr. 6, 1965

3,176,544
TRANSMISSION FOR RAIL VEHICLES WITH
INTERNAL COMBUSTION ENGINE
Carlotto Baumeister, Heidenheim (Brenz), Germany, assignor to Voith-Getriebe KG, Heidenheim (Brenz), Germany
Filed Aug. 2, 1961, Ser. No. 128,777
Claims priority, application Germany, Aug. 9, 1960, V 19,158
6 Claims. (Cl. 74—732)

The present invention relates to a transmission for rail vehicles with internal combustion engine.

It is an object of the present invention to provide a hydrodynamic transmission for rail vehicles with internal combustion engine, which in spite of a relatively simple construction may be used for switching as well as for long distance operations.

It is another object of this invention to provide a hydrodynamic transmission as set forth in the preceding paragraph which when used in connection with switching operations will not require a mechanical reversing switch mechanism thereby greatly facilitating the switching operations.

In this connection it should be kept in mind that the operation of mechanical reversing switch mechanisms, when transmitting high torques as required in connection with the drive of rail vehicles, is possible only when the vehicle is at a standstill by which fact the switching operation is made more difficult.

These and other objects and advantages of the invention will appear more clearly from the following specification in connection with the accompanying drawings, in which.

Figure 3:
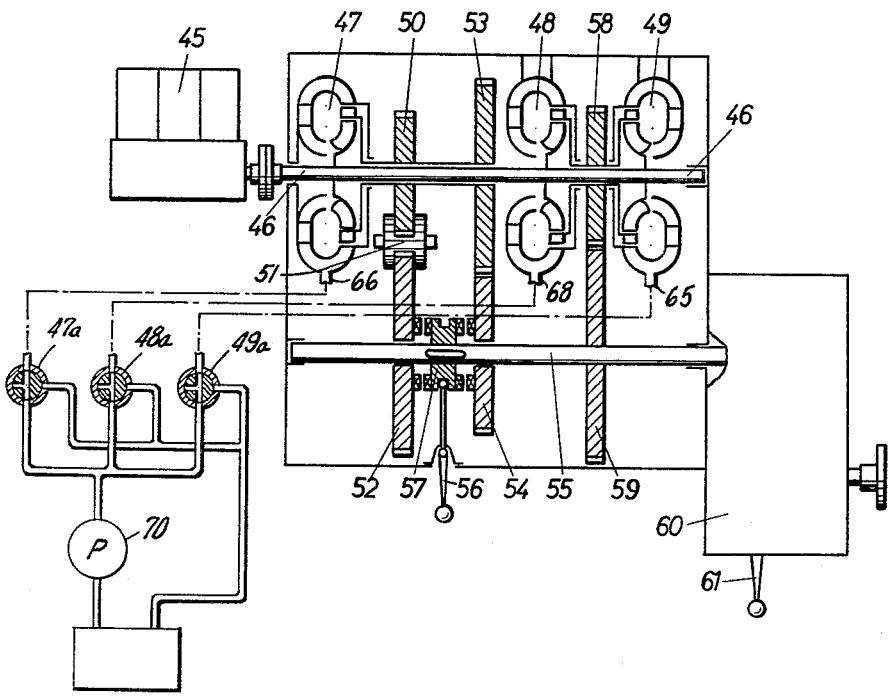

FIG. 3 diagrammatically illustrates a three velocity range transmission for switching and long distance operations with three torque converters and a succeeding reversing transmission.

In connection with transmissions of the above mentioned type, it has been suggested heretofore to provide separate fluid flow circuits on different driving axles for the velocity ranges in each driving direction. According to this design, during switching operations, the two circuits for the lowermost velocity ranges are selectively filled or emptied. This arrangement requires a considerable number of parts already due to the fact that for instance for two velocity ranges in two driving directions, four fluid flow circuits will be required. With an increase in the velocity ranges, the number of structural elements and the costs increase even further. In this connection it may be mentioned that for each further velocity range two further fluid flow circuits will be required.

The above mentioned drawbacks have been overcome and the above outlined objects have been realized by the present invention in the following manner.

The invention starts with a transmission for rail vehicles with internal combustion engine with at least two velocity ranges for long distance operation of which at least the lowermost velocity range has a fluid flow circuit and is succeeded by a mechanical shiftable reversing transmission. According to the present invention there is provided a further hydrodynamic velocity range for the lowermost velocity range. This hydrodynamic velocity range is preferably equipped with an additional gear which at the same control or shift position of the reversing transmission will drive the vehicle in a direction opposite to the direction of operation of the velocity ranges for long distance in such a manner that for the switching operation there will be provided one hydraulic velocity range each for each driving direction. These hydraulic velocity ranges are shiftable during driving and are independent of the shifting position of the reversing transmission.

Figure 1:
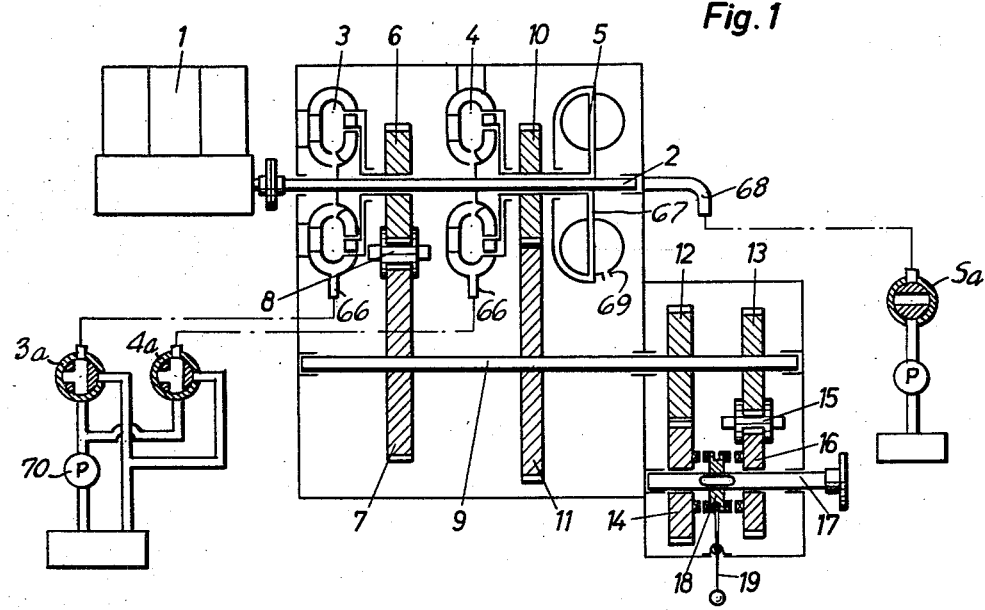
FIG. 1 is a diagrammatic illustration of a two velocity range transmission with a torque converter and a fluid coupling for long distance operation, and with a further torque converter for switching operations in the opposite direction and with a succeeding spur gear reversing transmission.

Referring now to the drawings in detail and FIG. 1 thereof in particular, the arrangement shown therein comprises an internal combustion engine which through the intervention of a shaft 2 drives the primary parts of two torque converters 3 and 4 and of a fluid coupling 5. The secondary part of the converter 3 is drivingly connected through spur gears 6 and 7 and a reversing spur gear 8 with a shaft 9, whereas the secondary parts of converter 4 and of coupling 5 are fixedly connected to a spur gear 10 adapted through the intervention of a spur gear 11 to drive shaft 9. Coupling 5 has a continuously open drain conduit 69 and a filling conduit 68 that has a controllable source of fluid connected thereto.

Keyed to shaft 9 are two spur gears 12, 13 of which gear 12 meshes with a spur gear 14 whereas gear 13 through an intermediate gear 15 is drivingly connected to a spur gear 16. The spur gears 14 and 16 are freely rotatably mounted on a shaft 17 which latter represents the output shaft of the entire transmission. By means of a jaw clutch 18 adapted to be actuated by a shift lever 19, each of the spur gears 14 and 16 is adapted selectively to be clutched to the output shaft 17.

With this transmission, the switching operation is effected by alternately filling or emptying the torque converter 3 or the torque converter 4 via the appropriate conduit 66. This may be effected in any position of the jaw clutch 18. If, for instance, converter 4 is employed for forward drive, the vehicle will drive in the opposite direction when converter 3 is filled. The shifting or reversing operation is effected in a shock-free manner and may be carried out during the drive. The converters 3, 4, and the spur gear transmissions 6, 7, 8 and 10, 11 are, as a rule, so designed that during the switching operation the same speeds will be available in forward and in rearward direction.

If it is desired instead of switching operations to carry out long distance driving operations, the jaw clutch 18 is shifted for the desired driving direction while the vehicle is at a standstill, whereupon the driving operation is started by means of converter 4. At higher speeds, the operator shifts over to coupling 5. When changing the driving direction during long distance operation, the jaw clutch 18 is reversed.

In FIGURE 1, conduits 66 and 69 serve for filing and emptying the respective fluid flow circuits. This control circuit is so designed that one circuit can always be filled, whereas the others can be emptied. The fluid flow coupling 5 according to FIGURE 1 is emptied primarily through continuously open conduit 69 if the flow or supply through conduit 68 (which supply otherwise is in excess of the discharge) is closed off.

The control circuit itself comprises a pump means 70 connected through rotary three-way valves with the pertaining fluid flow devices 3, 4 and 5 in FIGURE 1 and 47, 48 and 49 in FIGURE 3. Each valve, which bears the same number as its pertaining fluid flow device with the addition of a subscript "a" has a position where fluid is supplied from the pump means 70 to the pertaining fluid flow device and another position where the device is exhausted, except valve 5a of FIGURE 1 which does not need to provide exhaust from fluid flow device 5. This controlled circuit is similar to that shown in United States Patent 3,043,162.

With the transmission of FIGURE 1 for the speeds, the following lever positions will be obtained:

*Switching operations*
Forward—Valves adjusted to fill converter 4
Rearward—Valves adjusted to fill converter 3

*Long distance operations*
Lower Speed—Valves shifted to fill converter 4
Higher Speed—Valves shifted to fill coupling 5
(Direction determined by position of lever 19)

Figure 2:
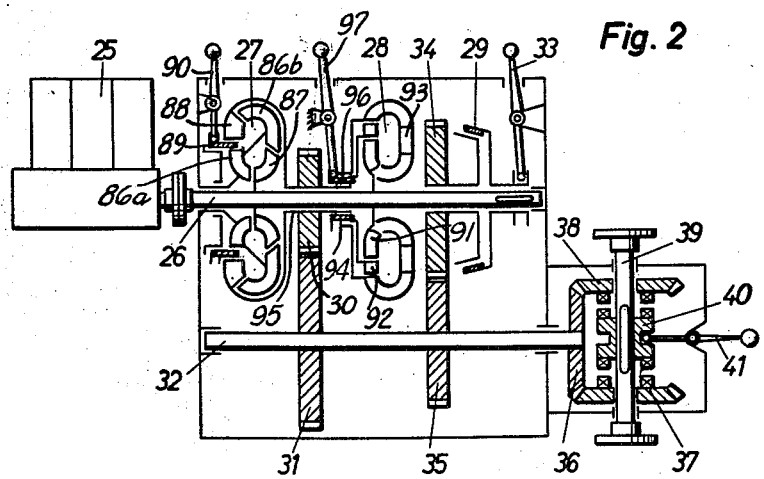
FIG. 2 is a diagrammatic illustration of a two velocity range transmission with a fluid torque converter and a mechanical shift clutch for long distance operation, with a reversing torque converter for switching operation in the opposite direction, and with a succeeding bevel gear reversing transmission.

The arrangement illustrated in FIG. 2 comprises an internal combustion engine 25 which drives a shaft 26 having keyed thereto the primary parts of a reversing converter 27 and an ordinary converter 28 and one half of a bevel gear friction clutch 29. The secondary parts of the converter 27, 28 are interconnected and comprise a spur gear 30 which drives a shaft 32 through the intervention of a spur gear 31 keyed thereto. The other half of the bevel gear friction clutch 29 has connected thereto a spur gear 34 and is freely rotatably mounted on shaft 26. By actuation of a shift lever 33 the said other half of the bevel gear friction clutch 29 may be drivingly connected to shaft 26. As will be seen from FIG. 2, spur gear 34 meshes with a spur gear 35 keyed to shaft 32.

Shaft 32 has keyed thereto a bevel gear 36 meshing with two further bevel gears 37, 38 which are freely rotatably mounted on a shaft 39 and which are adapted by means of a jaw clutch 40 and through the intervention of a lever 41 selectively to be clutched to shaft 39. Shaft 39 represents the output shaft of the entire transmission.

The switching operation is effected in a manner analogous to that of FIG. 1 by means of the two converters 27, 28. Due to the fact that the converter 27 is a reversing converter, the secondary part of which thus rotates in a direction opposite to that of the primary part, it will be evident that in contrast to the arrangement of FIG. 1, no reversing spur gear will be required.

With the transmission according to FIG. 2, the continuously filled converters 27 and 28 are adapted by means of an axially displaceable annular slide or an axially displaceable turbine wheel to be engaged and disengaged. Converter 27 has a two-stage guide wheel blading 86a/86b, a primary blading 87, and a secondary blading 88. By means of a lever 90 it is possible to move an annular slide 89 between the bladings 86a and 88 to interrupt the fluid flow and thereby the power transmission from the primary part to the secondary part. With the converter 28 comprising a primary blading 91, a secondary blading 92, and a guide wheel blading 93, the secondary blading is adapted to be moved out of the working chamber. To this end, a sleeve 94 connected to the secondary blading is axially displaceably but non-rotatably mounted on a hollow shaft 95 carrying the spur gear 30, and the sleeve 94 is adapted to be moved axially by means of a lever 97. The disengagement of the converter is thus, in this instance, accomplished by pulling a blading out of the working chamber The long distance operation of the transmission of FIG. 2 is effected in a manner analogous to that of FIG 1 with the exception that instead of the fluid coupling 5 of FIG. 1 in FIG. 2 the bevel gear friction clutch 29 is actuated for making the second velocity range effective during long distance operation.

An advantageous further development of the present invention consists in that for obtaining a second or another upper velocity range for the long distance operation, there is provided a further purely mechanical power path which is arranged in parallel to the purely mechanical power path behind the circuit of the lowermost hydrodynamic velocity range of the driving direction opposite to the other long distance velocity ranges. This additional purely mechanical power path starts from said last mentioned circuit and is adapted independently of the shifting position of the mechanical reversing transmission to bring about the same driving direction as the other long distance velocity ranges. Furthermore, there is provided a mechanical clutch which preferably is shiftable only at a standstill of the vehicle and is adapted alternately to make the said two purely mechanical power paths effective. Such an arrangement of the transmission will make it possible to employ for long distance operation the fluid flow circuit for the lowermost velocity range of that driving direction which is opposite to the driving direction of said long distance velocity ranges, which fluid circuit for said lowermost velocity range could with the above described arrangement be used only during the switching operation. Thus, a further circuit is saved so that for instance for a transmission with switching operation and with three long distance velocity ranges in both driving directions, three circuits only or two circuits only and one mechanical velocity clutch will be required. Nevertheless, all above mentioned advantages will also be realized with this transmission, namely shock-free switching operation with "counter steam effect" by filling the circuit for the possible driving direction already during driving operations, and also a wide velocity range will be obtained in view of a plurality of velocity ranges. The mechanical switch clutch will take the place of the saved fluid flow circuit. This clutch has to be shifted only at a standstill of the vehicle as is the case with the reversing transmission clutch, and only when it is intended to change from switching to long distance operation or vice versa. This mechanical shift clutch, may, therefore, be designed in a very simple manner, for instance as non-sychronized jaw clutch 18, 40 as described above.

FIG. 3 illustrates a further embodiment of a transmission according to the present invention which with only three torque converters has one switching velocity range and three long distance velocity ranges in the two driving directions. According to this arrangement, an internal combustion engine 45 has clutched thereto a shaft 46 to which are keyed the primary parts of the three fluid flow converters 47, 48, 49. The secondary part of converter 47 is connected to two mechanical power paths which comprise the spur gears 50, 51, 52 and 53, 54. The spur gears 52 and 54 are freely rotatably mounted on shaft 55 and may alternately be coupled to shaft 55 by means of a jaw clutch 57 adapted to be actuated by a lever 56. The secondary parts of converter 48, 49 are continuously drivingly connected with the same shaft 55 through the intervention of spur gears 58, 59.

As will be evident from FIG. 3, shaft 55 is followed by and connected to a reversing transmission 60 adapted to be controlled by a lever 61. The construction of this reversing transmission is the same as that shown in FIG. 1.

In any position of the shift lever 61, while the spur gear 52 is fixedly connected to shaft 55 through jaw clutch 57 (left shifting position), the switching operation will be possible through converter 47 or 49. When it is desired to shift from switching operation to long distance operation, the jaw clutch 57 is moved toward the right while the vehicle is at a standstill. Lever 61 will be adjusted in conformity with the desired driving direction unless lever 61 is already in the respective shifting position, whereupon converter 49 is filled for the first velocity range of the converter.

In FIGURE 3, conduits 65, 66 and 68 control the converter filling and lead to the valves 47a, 48a and 49a.

The valve positions for the FIGURE 3 arrangement are as follows:

*Switching operation: (Coupling sleeve 57 in left position)*

Forward drive—Valves shifted to fill converter 49
Rearward drive—Valves shifted to fill converter 47

*Long distance operation: in one direction (depending on position of lever 61; coupling sleeve 57 in right position)*

First speed—Valves shifted to fill converter 49
Second speed—Valves shifted to fill converter 47
Third speed—Valves shifted to fill converter 48.

As will be evident from the above, the present invention yields a transmission which in spite of a minimum of shifting elements is well suitable for long distance operation as well as for switching operation. During the switching operation, a single low speed in both directions is generally sufficient. Thus, according to the present invention, one fluid flow circuit each for each driving direction will be available for the switching operation while the fluid flow circuit is adapted selectively to be made effective or ineffective by well known means, as for instance filling and emptying, an annular slide, or by means of a displaceable turbine wheel. It will also be appreciated that with a transmission designed according to the present invention no shocks will occur when reversing the driving direction during a switching operation. As a matter of fact, as likewise indicated above, the reversing for driving in the other direction may be effected already during the driving operation so that a quick braking and starting will be obtained. In view of the desired high pulling forces and the required torque conversion inherent thereto when starting and when switching, these circuits are advantageously designed as fluid flow converters.

It may be added that the torque converter for the switching velocity range opposite to the lowermost velocity range for long distance operation need not necessarily be connected with the remaining transmission through an adidtional gear. It is also possible to employ a reversing converter in connection with which, by a corresponding design of the blading, the secondary part may be driven in a direction opposite to the primary part.

For long distance operation, in addition to the fluid flow circuit for the switching velocity range opposite to the lowermost long distance velocity range, only that many velocity range switching means have to be provided as long distance velocity ranges are required. It will be appreciated that in view of the mechanical reversing transmission, these long distance velocity ranges may be employed in both driving directions. As shifting means for the second and the upper velocity ranges fluid flow couplings may be provided or mechanical couplings which are adapted to be actuated during the driving operation.

If for instance three velocity ranges are required for long distance operation in both directions, in addition to the fluid circuit for the driving direction opposite to the long distance velocity ranges, only three further circuits are required which are mounted on a common shaft. Of these three circuits, the circuit for the lowermost velocity range has advantageously almost the same transmission ratio as the circuit for the opposite driving direction so that during the switching operation, forward and rearward drive have approximately the same speeds. The number of four circuits for a three velocity range long distance operation in both directions and for a switching operation shiftable during the driving operation is extremely low.

It is furthermore to be noted that a mechanical reversing transmission which is shiftable only at a standstill of the vehicle will not interfere with the driving operation. This reversing transmission will be actuated either when it is intended to shift from switching operation to long distance operation, but even in this instance only when previously during the switching operation the shifting position of the reversing transmission did not correspond to the desired driving direction for long distance operation, or when during long distance operation, for instance at the terminal, a change in the driving direction has to be effected. In all these instances there will be ample time and opportunity to shift the reversing transmission while the vehicle is at a standstill so that this reversing shift arrangement will have no drawbacks.

It is, of course, to be understood that the present invention is, by no means, limited to the particular constructions shown in the drawings but also comprises any modifications within the scope of the appended claims.

What I claim is:

1. In an internal combustion engine driven rail vehicle: input shaft means for driving connection with an internal combustion engine, transmission shaft means, output shaft means, at least two different velocity range transmissions operatively connected between said input shaft means and said transmission shaft means for respectively selectively effecting driving connection between said input shaft means and said transmission shaft means, said two transmissions being operable to drive said transmission shaft means in one and the same direction of rotation, at least the one of said two transmissions having the lowermost velocity including a fluid flow power transmitting unit, means selectively operable for effectively interrupting the flow of fluid in said unit to make said one transmission ineffective for transmitting power, a mechanical shiftable reversing transmission operatively connected between said transmission shaft means and said output shaft means for selectively reversing the direction of rotation of said output shaft means, and an additional velocity range transmission operatively connected between said input shaft means and said transmission shaft means for respectively selectively effecting driving connection between said input shaft means and said transmission shaft means, said additional velocity range transmission including a fluid flow circuit and having a velocity range within the limits of the lowermost velocity range of said two first mentioned transmissions and being operable at one and the same position of said mechanical reversing transmission to drive said output shaft means in a direction of rotation opposite to the direction of rotation of said output shaft means when the latter is driven by one of said two first mentioned transmissions, whereby in both lowermost ranges said output shaft means has available one hydraulically controllable velocity range transmission in each direction of rotation regardless of the respective position of said reversing transmission.

2. In an internal combustion engine driven rail vehicle: input shaft means for driving connection with an internal combustion engine, transmission shaft means, output shaft means, at least two different velocity range transmissions operatively connected between said input shaft means and said transmission shaft means for respectively selectively effecting driving connection between said input shaft means and said transmission shaft means, that one of said two different velocity range transmissions which has the lower velocity range comprising a fluid flow converter having bladed output wheel means associated with said converter for selectively interrupting the fluid flow over the blades of the output wheel for selectively making said one transmission ineffective for transmitting power to said transmission shaft means, a mechanical shiftable reversing transmission operatively connected between said transmission shaft means and said output shaft means for selectively reversing the direction of rotation of said output shaft means, and an additional velocity range transmission operatively connected between said input shaft means and said transmission shaft means and also including a fluid flow converter and having a velocity range within the limits of the lowermost velocity range of said two first mentioned transmissions, said additional velocity range transmission being operable at one and the same position of said mechanical reversing transmission to drive said output shaft means in a direction opposite to the direction thereof when driven by one of said first mentioned transmissions, whereby in both lowermost ranges said output shaft means has available one hydraulically controllable velocity range transmission in each direction of rotation regardless of the respective position of said reversing transmission.

3. In an internal combustion engine driven rail vehicle: input shaft means for driving connection with an internal combustion engine, transmission shaft means, output shaft means, a plurality of different velocity range transmissions operatively connected between said input shaft means and said transmission shaft means for respectively selectively effecting driving connection between said input shaft means and said transmission shaft means, the lowermost one of said plurality of different velocity range transmissions including a fluid flow circuit and at least one of the other velocity range transmission of said plurality of different velocity range transmissions including a fluid coupling, means selectively operable for filling and emptying said coupling to make said one transmission ineffective for transmitting power, a mechanical shiftable reversing transmission operatively connected between said transmission shaft means and said output shaft means for selectively reversing the direction of rotation of said output shaft means, and an additional velocity range transmission including a fluid flow circuit and having a velocity range within the limits of the lowermost velocity range of said plurality of different velocity range transmissions and operatively connected between said input shaft means and said transmission shaft means, said additional velocity range transmission being operable at one and the same position of said mechanical reversing transmission to drive said output shaft means in a driving direction opposite to the direction thereof when driven by one of said plurality of transmissions, whereby there is available one hydraulically controllable velocity range transmission in each direction of rotation of said output shaft means regardless of the respective position of said reversing transmission, said last mentioned hydraulically controllable transmission being controllable during rotation of said output shaft means.

4. In an internal combustion engine driven rail vehicle: input shaft means for driving connection with an internal combustion engine, transmission shaft means, output shaft means, a plurality of different velocity range transmissions operatively connected between said input shaft means and said transmission shaft means for respectively selectively effecting driving connection between said input shaft means and said transmission shaft means, the lowermost one of said plurality of different velocity range transmissions including a fluid flow circuit adapted to be made selectively effective and ineffective and at least one of the other velocity range transmissions of said plurality of different velocity range transmissions including a mechanical clutch adapted to be shifted during driving operation, a mechanical shiftable reversing transmission operatively connected between said transmission shaft means and said output shaft means for selectively reversing the direction of rotation of said output shaft means, and an additional velocity range transmission including a fluid flow circuit and having a velocity range within the limits of the lowermost velocity range of said plurality of different velocity range transmissions and operatively connected between said input shaft means and said transmission shaft means, said additional velocity range transmission being operable at one and the same position of said mechanical reversing transmission to drive said output shaft means in a direction opposite to the direction thereof when driven by one of said plurality of transmissions whereby there is available one hydraulically controllable velocity range transmission in each direction of said output shaft means regardless of the respective position of said reversing transmission, said last mentioned hydraulically controllable transmission being controllable during rotation of said output shaft means.

5. In an internal combustion engine driven rail vehicle: input shaft means for driving connection with an internal combustion engine, transmission shaft means, output shaft means, at least two different velocity range transmissions operatively connected between said input shaft means and said transmission shaft means for respectively selectively effecting driving connection between said input shaft means and said transmission shaft means, a mechanical shiftable reversing transmission operatively connected between said transmission shaft means and said output shaft means for selectively reversing the direction of rotation of said output shaft means, one of said two different velocity range transmissions including a first fluid flow circuit and also including a first mechanical power path and being the transmission with the lowermost velocity range, while the other of said two different velocity range transmissions includes a second fluid flow circuit and a second mechanical power path, the driving direction of said output shaft means being at one and the same position of said reversing transmission the same for both said one and said other of the two different velocity range transmissions, a further velocity range transmission including said second fluid flow circuit and a third mechanical power path operatively connected between said input shaft means and said transmission shaft means and adapted selectively to effect driving connection between said input shaft means and said transmission shaft means and having a velocity range within the limits of said lowermost velocity range of said one of the two different velocity range transmissions and being adapted at one and the same position of said mechanical reversing transmission to drive said transmission shaft means in a direction opposite to the direction thereof when driven by said one of the two different velocity range transmissions, means operable for effectively interrupting the flow of fluid in said fluid flow circuits selectively to make the pertaining velocity range transmissions selectively ineffective for transmitting power, and coupling means operable selectively for alternately connecting the output end of one of said further velocity range transmission and of said other of said two different velocity range transmissions to said transmission shaft means while disconnecting the output end of the other thereof from said transmission shaft means, whereby there is available one hydraulically controllable velocity range transmission in each driving direction of said output shaft means regardless of the respective position of said reversing transmission, said last mentioned hydraulically controllable transmission being controllable during the driving of said output shaft means.

6. An arrangement according to claim 5, in which said coupling means comprises, elements of jaw clutch means on said transmission shaft means and on the output ends of said two different velocity range transmissions, the said jaw clutch element on the transmission shaft means being selectively engageable with the jaw clutch elements on the output ends of said two different velocity range transmissions.

References Cited by the Examiner

UNITED STATES PATENTS

| 2,142,199 | 1/39 | Lysholm | 74—720 |
| 2,142,269 | 1/39 | Gossler | 74—720 |
| 2,301,294 | 11/42 | Kuhns et al. | 74—720 |
| 2,379,015 | 6/45 | Lysholm | 74—720 |
| 2,892,356 | 6/59 | Sinclair | 74—664 |

FOREIGN PATENTS

| 461,947 | 2/37 | Great Britain. |
| 178,853 | 11/35 | Switzerland. |

DON A. WAITE, *Primary Examiner.*